UNITED STATES PATENT OFFICE.

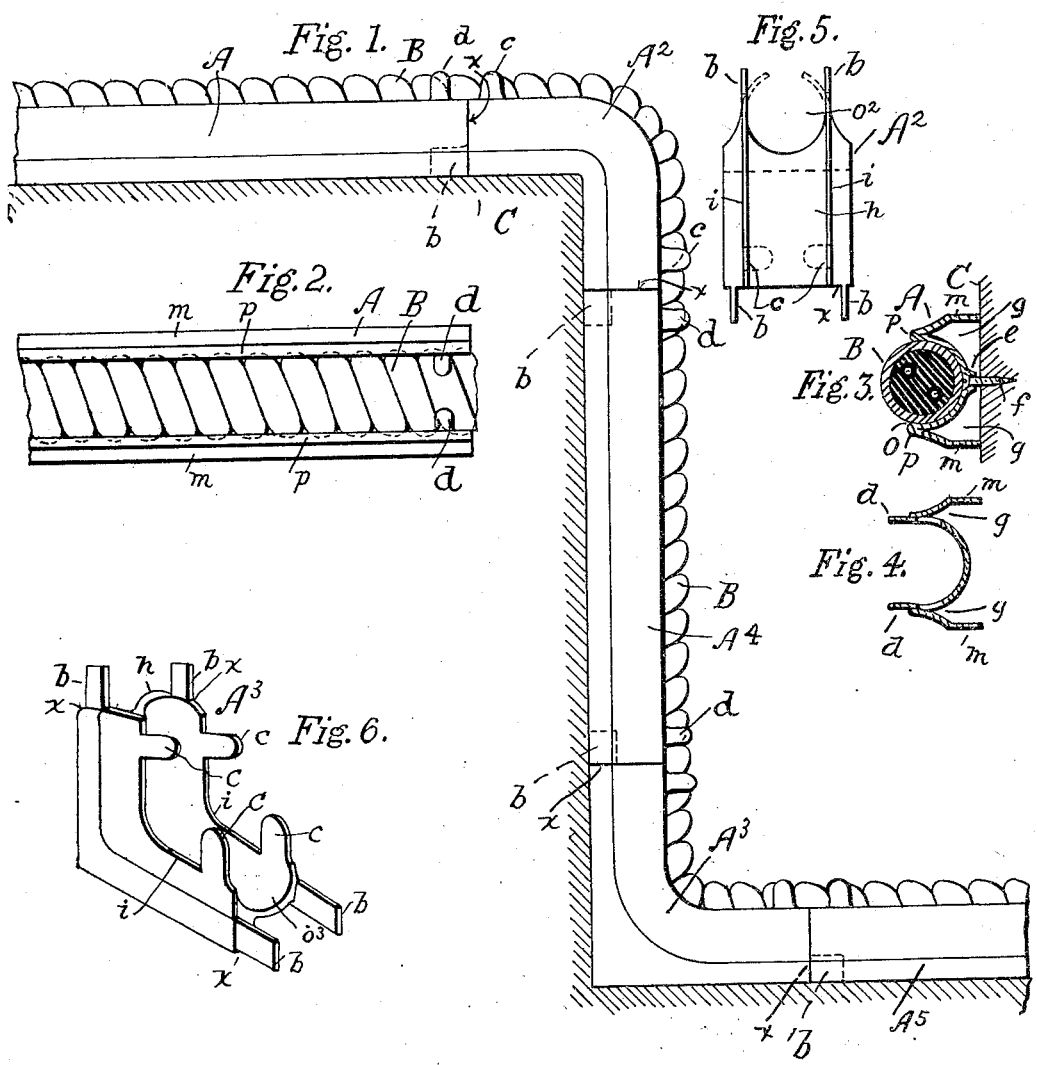

FREDERIC WM. ERICKSON, OF NEW YORK, N. Y.

ELECTRIC-CONDUCTOR DISTRIBUTION.

1,015,484.    Specification of Letters Patent.    Patented Jan. 23, 1912.

Application filed June 24, 1911. Serial No. 635,105.

*To all whom it may concern:*

Be it known that I, FREDERIC WM. ERICKSON, residing at New York, in the county of New York and State of New York, have invented certain Improvements in Electric-Conductor Distribution, of which the following is a specification.

This invention relates to a system of electric conductor distribution in which insulated conductors preferably inclosed in flexible sheaths are supported by moldings secured to the walls and ceilings of buildings, a suitable depression being formed in the outer face of said moldings in which the conductors are located and secured.

In the improvement constituting the invention the open conduits or moldings employed are preferably made of thin resilient metal in such cross-section that the edges thereof rest upon the surface of the walls and ceilings to form an even and close contact therewith, while the central part is hollowed in the shape of a trough whose approaching edges constitute a restricted opening of less width than the diameter of the trough itself, in order that when a conductor is placed therein the said edges will overlap and hold it securely in place by spring pressure.

In order to provide additional security and make sure that the conductor will be held within the trough I arrange uplifted clips cut out of the same material of which the molding is made, which can be bent over into the conductor sheath. I also provide novel angle brackets or elbows to support the conductor in the short turns in connection with the conduit system, having suitable means for interlocking with the ends of the molding with which they abut. All of which I will now proceed to describe and point out in the appended claims, reference being made to the accompanying drawings forming a part of and illustrating the invention.

Figure 1 is an edge view of the system, to show how an armored cable or conductor may be supported upon a wall or ceiling. Fig. 2 is a plan view of a portion of the above. Fig. 3 is a cross-section of the molding and cable. Fig. 4 is a cross-section of the molding A, A⁴ and A⁵. Fig. 5 is an end view of an angle bracket, and Fig. 6 is a perspective view of a second angle bracket.

In the drawings C represents the face of a wall or ceiling upon which is secured the straight lengths of an open metal conduit or molding A joined at the turns or corners by the angle brackets A² and A³, and B is the insulated conductor or cable, represented as being of the well-known flexible metal armored type.

The molding is made of thin resilient metal rolled into shape, with two sides or supports $m$ $m$, between which is a depression or trough O whose approaching edges $p$ $p$ extend above the diameter of the trough as shown in Fig. 3, so that the distance between them is less than the diameter of the trough:—such a cross-section provides longitudinal spaces $g$ $g$ which are availed of as hereinafter referred to. The molding has counter-sunk holes $e$ at suitable intervals to receive screws $f$—for holding the molding to the wall; and at certain distances on each side of the molding portions may be cut out of the hollow portion $o$ and bent outward to form clips $d$ $d$ as shown in Fig. 4.

The angle bracket A² is a thin casting, having a back $h$ from which extend the bars $b$ $b$ at each end, and the sides $i$ $i$ between which is the external hollow space O² and integral with the sides are the clips C C. The angle bracket A³ is a thin casting and has a back $h$ from which extend bars $b$ $b$ at each of its ends, and the sides $i$ $i$ between which is the internal hollow space O³ and integral with the sides are the clips $c$ $c$.

In the course of construction after the direction of the conductor is laid out, a length of molding A is secured by screws $f$ in place on the wall C and if an angle bracket A² is to be used the bars $b$ $b$ on one end thereof are inserted into the spaces $g$ $g$ at the end of the molding, and the ends $x$ $x$ of the bracket butted to the same, while the opposite bars $b$ $b$ of the bracket are inserted into the spaces $g$ $g$ of a second molding which is then secured to the wall; and if an angle bracket A³ is to follow, the bars $b$ $b$ on one of its ends are inserted into the spaces $g$ $g$ of the open end of the second molding and a third molding is fastened to the wall and locked to the unengaged or free end of the bracket A³, as described of the other connections. It will be seen that when the parts are in place that the brackets are held in position by their end bars $b$ $b$ and firmly locked to the moldings which are screwed to the wall.

One end of the armored conductor or cable B is presumed to be attached to a wall distributing box, not shown, near to which the molding A approaches, while the cable itself is located in the hollow of the molding. The metal sheath or covering for insulated conductors is, as is well known, made from narrow metal ribbon wound in spiral form and possesses much flexibility and has considerable compressibility or diametrical resiliency, a property I take advantage of in the present system of distribution, when the conductor or cable is to be inserted into the opening $o$ of the molding, for when the cable is pressed into said opening its sides $p$ $p$ are forcibly expanded and at the same time the sides of the metal sheath are compressed, and when the cable is within the hollow space the edges of the opening $o$ being free from pressure spring inward and the metal sheath of the cable expands, both of which operations tend to hold the cable in position. When the cable has been forced into the conduit, and the short turns made into the hollows $O^2$ and $O^3$ of the angle brackets $A^2$ and $A^3$ the clips $d$ $d$ on the conduits and $c$ $c$ on the brackets are forced over on to the face of the cable and firmly hold it in place.

I claim as my invention:

1. A supporting member for electric conductors made of thin resilient metal having a longitudinal trough in its outer face the edges of the metal forming supporting sides, with clips extending from the edges of the trough opening, as set forth.

2. A supporting member for electric conductors made from a ribbon of thin resilient metal the outer edges turned over in opposite directions to form supports and the central portion depressed to form a trough, with clips extending from the edges of the trough, as set forth.

3. A supporting member for electric conductors made from a ribbon of thin resilient metal the outer edges turned over in opposite directions to form supports and the central portion depressed to form a trough, with clips punched from the metal and bent upward from the sides of the trough, as and for the purpose set forth.

4. Angle pieces for supporting members for electric conduits, consisting of right angled portions having supporting edges the ends of which are provided with extension bars, with a trough like interior from the edges of which extend clips, as set forth.

5. Angle pieces for conduits consisting of right angled portions having sides with supporting edges the ends of which are provided with extension bars the space between said sides having a concaved surface, with clips extending from its edges, as set forth.

In testimony whereof, I have signed my name to this specification in the presence of two subscribing witnesses, this 20th day of June, 1911.

FREDERIC WM. ERICKSON.

Witnesses:
ROBERT E. BREWER,
JOHN A. COLE.

---

Copies of this patent may be obtained for five cents each, by addressing the "Commissioner of Patents, Washington, D. C."